United States Patent
Tsai et al.

(10) Patent No.: US 11,087,142 B2
(45) Date of Patent: Aug. 10, 2021

(54) RECOGNIZING FINE-GRAINED OBJECTS IN SURVEILLANCE CAMERA IMAGES

(71) Applicant: NEC Laboratories America, Inc., Princeton, NJ (US)

(72) Inventors: Yi-Hsuan Tsai, San Jose, CA (US); Manmohan Chandraker, Santa Clara, CA (US); Shuyang Dai, Durham, NC (US); Kihyuk Sohn, Fremont, CA (US)

(73) Assignee: NEC Corporation

( * ) Notice: Subject to any disclaimer, the term of this patent is extended or adjusted under 35 U.S.C. 154(b) by 167 days.

(21) Appl. No.: 16/567,236

(22) Filed: Sep. 11, 2019

(65) Prior Publication Data
US 2020/0089966 A1 Mar. 19, 2020

Related U.S. Application Data

(60) Provisional application No. 62/730,759, filed on Sep. 13, 2018.

(51) Int. Cl.
*G06K 9/00* (2006.01)
*G06N 3/08* (2006.01)
*G06K 9/62* (2006.01)

(52) U.S. Cl.
CPC ..... *G06K 9/00771* (2013.01); *G06K 9/00221* (2013.01); *G06K 9/6215* (2013.01); *G06K 9/6259* (2013.01); *G06N 3/08* (2013.01); *G06K 2209/23* (2013.01)

(58) Field of Classification Search
CPC .......... G06K 9/00771; G06K 9/00221; G06K 9/6215; G06K 9/6259; G06K 2209/23; G06N 3/08
See application file for complete search history.

(56) References Cited

U.S. PATENT DOCUMENTS 10,956,817 B2* 3/2021 Oliveira Pinheiro ....................... G06T 7/0002
2021/0012198 A1* 1/2021 Zhang ................ G06N 3/084

FOREIGN PATENT DOCUMENTS

WO WO-2020104072 A1 * 5/2020 ............. G06N 20/20

OTHER PUBLICATIONS

J. Zhang, W. Li and p. Ogunbona, "Joint Geometrical and Statistical Alignment for Visual Domain Adaptation," 2017 IEEE Conference on Computer Vision and Pattern Recognition (CVPR), 2017, pp. 5150-5158, doi: 10.1109/CVPR.2017.547. (Year: 2017 ).*

Schoenauer-Sebag, Alice, et al. "Multi-domain adversarial learning." arXiv preprint arXiv: 1903.09239 (2019). (Year: 2019).*

(Continued)

*Primary Examiner* — Utpal D Shah
(74) *Attorney, Agent, or Firm* — Joseph Kolodka

(57) ABSTRACT

Systems and methods for recognizing fine-grained objects are provided. The system divides unlabeled training data from a target domain into two or more target subdomains using an attribute annotation. The system ranks the target subdomains based on a similarity to the source domain. The system applies multiple domain discriminators between each of the target subdomains and a mixture of the source domain and preceding target domains. The system recognizes, using the multiple domain discriminators for the target domain, fine-grained objects.

20 Claims, 6 Drawing Sheets

(56) References Cited

OTHER PUBLICATIONS

Ganin, Yaroslav, et al. "Domain-adversarial training of neural networks." The journal of machine learning research 17.1 (2016): 2096-2030. (Year: 2016).*

Yang et al, "A Large-Scale Car Dataset for Fine-Grained Categorization and Verification", Proceedings of the IEEE Conference on Computer Vision and Pattern Recognition. Jun. 7-12, 2015. pp. 3973-3981.

Sohn et al., "Unsupervised Domain Adaptation for Face Recognition in Unlabeled Videos", Proceedings of the IEEE International Conference on Computer Vision. Oct. 22-29, 2017. pp. 3210-3218.

Zhao et al., "Multiple Source Domain Adaptation with Adversarial Training of Neural Networks", arXiv preprint arXiv:1705.09684. May 26, 2017. pp. 1-24.

* cited by examiner

RECOGNIZING FINE-GRAINED OBJECTS IN SURVEILLANCE CAMERA IMAGES

RELATED APPLICATION INFORMATION

This application claims priority to U.S. Provisional Patent Application No. 62/730,759, filed on Sep. 13, 2018, incorporated herein by reference herein its entirety.

BACKGROUND

Technical Field

The present invention relates to deep learning and more particularly to applying deep learning for fine-grained object recognition.

Description of the Related Art

Deep learning has been successfully applied to solve fine-grained object recognition problems with large-scale labeled training data by manually labeling images. To generalize to test cases whose environment is drastically different from the training images, different approaches have been attempted. These approaches include data-agnostic data augmentation techniques, and data-driven domain adaptation techniques. The data-driven domain adaptation techniques include pixel-level unpaired image-to-image translation and domain adversarial neural networks.

SUMMARY

According to an aspect of the present invention, a method is provided for recognizing fine-grained objects. The method includes dividing, by a processor device, unlabeled training data from a target domain into two or more target subdomains using an attribute annotation. The method also includes ranking the two or more target subdomains based on a similarity to the source domain. The method further includes applying multiple domain discriminators between each of the two or more target subdomains and a mixture of the source domain and preceding target domains. The method includes recognizing, using the multiple domain discriminators for the target domain, fine-grained objects.

According to another aspect of the present invention, a system is provided for recognizing fine-grained objects. The system divides unlabeled training data from a target domain into two or more target subdomains using an attribute annotation. The system ranks the target subdomains based on a similarity to the source domain. The system applies multiple domain discriminators between each of the target subdomains and a mixture of the source domain and preceding target domains. The system recognizes, using the multiple domain discriminators for the target domain, fine-grained objects.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
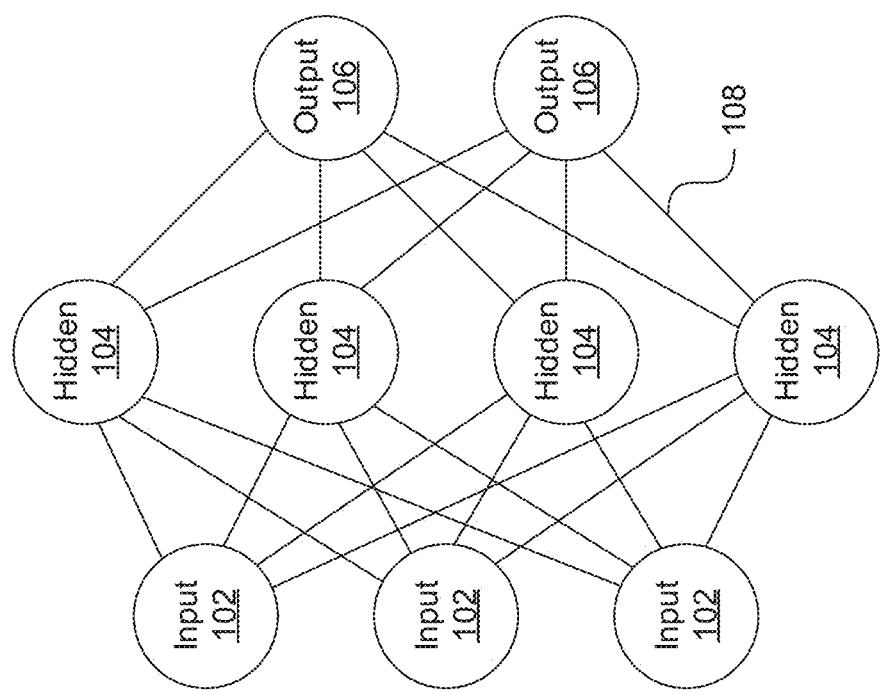
FIG. 1 is a generalized diagram of a neural network, in accordance with an embodiment of the present invention.

In accordance with embodiments of the present invention, systems and methods are provided to/for deep domain adaptation to recognize fine-grained objects, such as faces or cars, at extreme conditions by utilizing labeled training data from a first source/domain (for example, the web) and unlabeled training data from the target domain (which is same or similar to deployment environment) at various conditions.

In one embodiment, the system divides unlabeled training data from a target domain into two or more domains using attribute annotations, such as lighting conditions or weather conditions and ranks the domains based on the similarity to the source domain.

In one embodiment, the systems explore attributes in the target domain. The example embodiments also facilitate multi-step adversarial training with multiple target domains.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a generalized diagram of a neural network that can implement deep domain adaptation to recognize fine-grained objects is shown, according to an example embodiment.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

The ANN can be implemented to perform deep domain adaptation to recognize fine-grained objects, in a manner as described with respect to the ensuing paragraphs and FIGS. The ANN described with respect to FIG. 1 can be one of multiple (for example, shared) ANNs that are implemented in concert.

Figure 2:
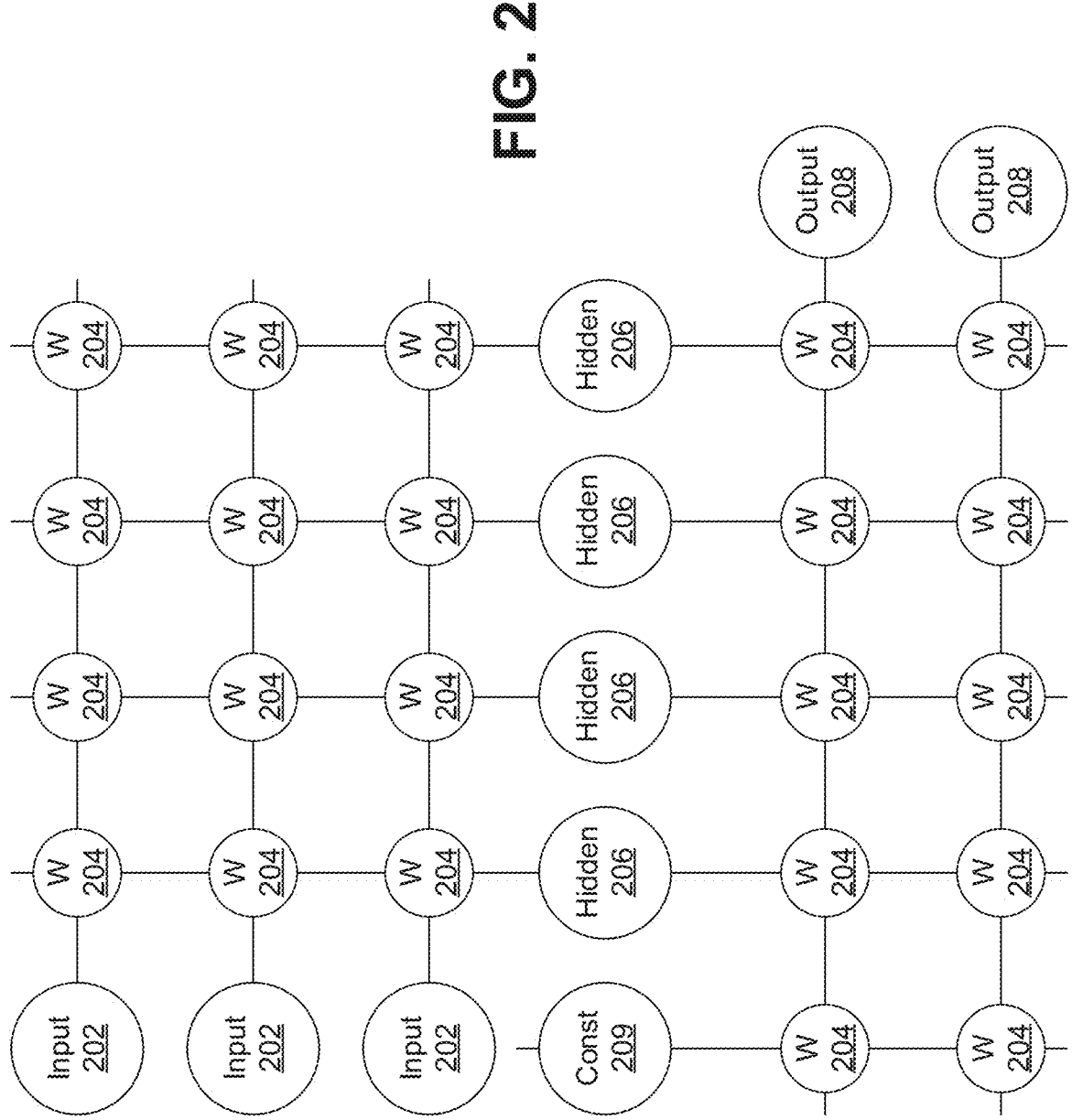
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A convolutional neural networks (CNN) is a subclass of ANNs which has at least one convolution layer. A CNN consists of an input and an output layer, as well as multiple hidden layers. The hidden layers of a CNN consist of convolutional layers, rectified linear unit (RELU) layer (e.g., activation function), pooling layers, fully connected layers and normalization layers. Convolutional layers apply a convolution operation to the input and pass the result to the next layer. The convolution emulates the response of an individual neuron to visual stimuli.

CNNs can be applied to analyzing visual imagery. CNNs can capture local information (e.g., neighbor pixels in an image or surrounding words in a text) as well as reduce the complexity of a model (to allow, for example, faster training, requirement of fewer samples, and reduction of the chance of overfitting).

CNNs use a variation of multilayer perceptrons designed to require minimal preprocessing. CNNs are also known as shift invariant or space invariant artificial neural networks (SIANN), based on their shared-weights architecture and translation invariance characteristics. CNNs can be used for applications in image and video recognition, recommender systems, image classification, medical image analysis, and natural language processing.

The CNNs can be applied in a deep domain adaptation process to recognize fine-grained objects at different conditions by utilizing labeled training data from a database and unlabeled training data from a target.

Figure 3:
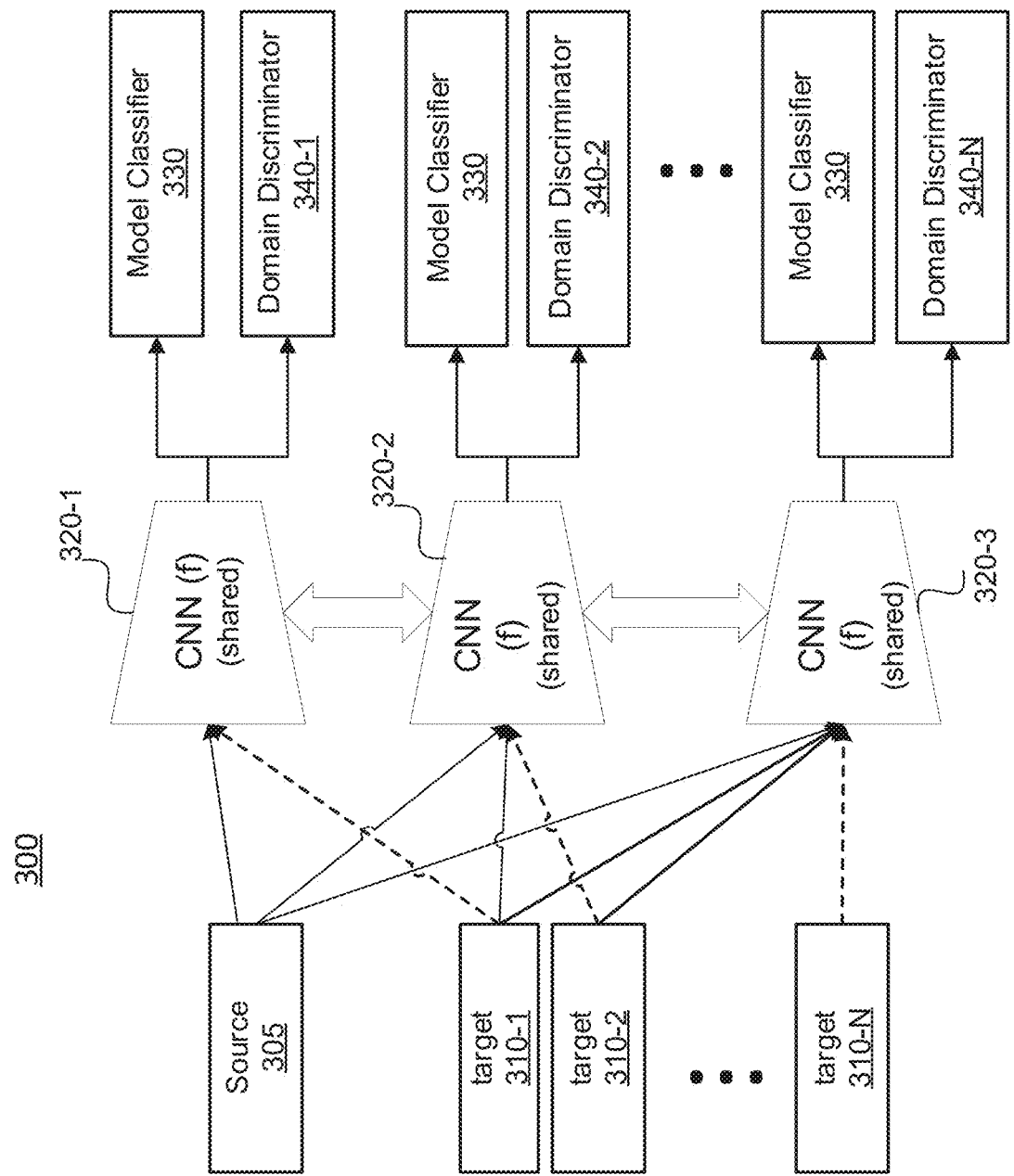
FIG. 3 is a block diagram illustrating a training protocol of a deep neural network with labeled source domain and multiple unlabeled target domains, in accordance with an embodiment of the present invention.

Referring now to FIG. 3, a system 300 for multi-stage domain adversarial training is illustratively depicted in accordance with an embodiment of the present invention.

As shown in FIG. 3, the system 300 includes components for implementing a training protocol of a deep neural network with labeled source domain and multiple unlabeled target domains. The system 300 includes a source (domain) 305, and multiple target domains 310 (shown as target 1 (310-1) to target N (310-N)). The source domain 305 and multiple target domains 310 provide images to shared CNNs 320 as a function f (shown, by way of example, as CNN (f) (shared) 320-1 to CNN (f) (shared) 320-3) that output a (for example, shared) model classifier 330 and one of multiple domain discriminators 340 (shown as domain discriminator 1 (340-1) to domain discriminator N (340-N)) for each of the different types of images from the source 305 and target domains 310. Each of the multiple domain discriminators 340 correspond to one of the multiple target domains 310. A domain discriminator is learned by minimizing the classification error of distinguishing whether the image is from the source domain or the target domains. A model classifier classifies models of the domains based on conditions or attributes associated with the domains, such as lighting conditions or weather conditions.

The example embodiments described herein provide a deep domain adaptation process to recognize fine-grained objects (such as, for example, a face, a car, text, etc.) at different (for example, extreme, varied, etc.) conditions by utilizing labeled training data from a first source 305 or database (for example, web or Internet provided training data, such as labeled images, etc.) and unlabeled training data from a target 310 (for example, a same or similar to deployment environment) at various conditions.

The example embodiments utilize multiple domain discriminators 340 to deal with multiple target domains 310 for domain adversarial training. Domain adversarial training between the target and source domain contributes to reducing the gap between two domains. Each domain discriminator 340 is trained to differentiate not only between the target 310 and the source domain 305, but also between the target domain 310 and all the previous target domains 310 that are known to be closer to the source domain 305 than the current target domain 310.

For example, the system 300 can divide unlabeled training data from (for example, a particular) target domain 310 into two or more domains using attribute annotations, such as, for example, lighting conditions or weather conditions and rank the target domains 310 based on the similarity to the source domain, as described herein below with respect to FIG. 4.

Figure 4:
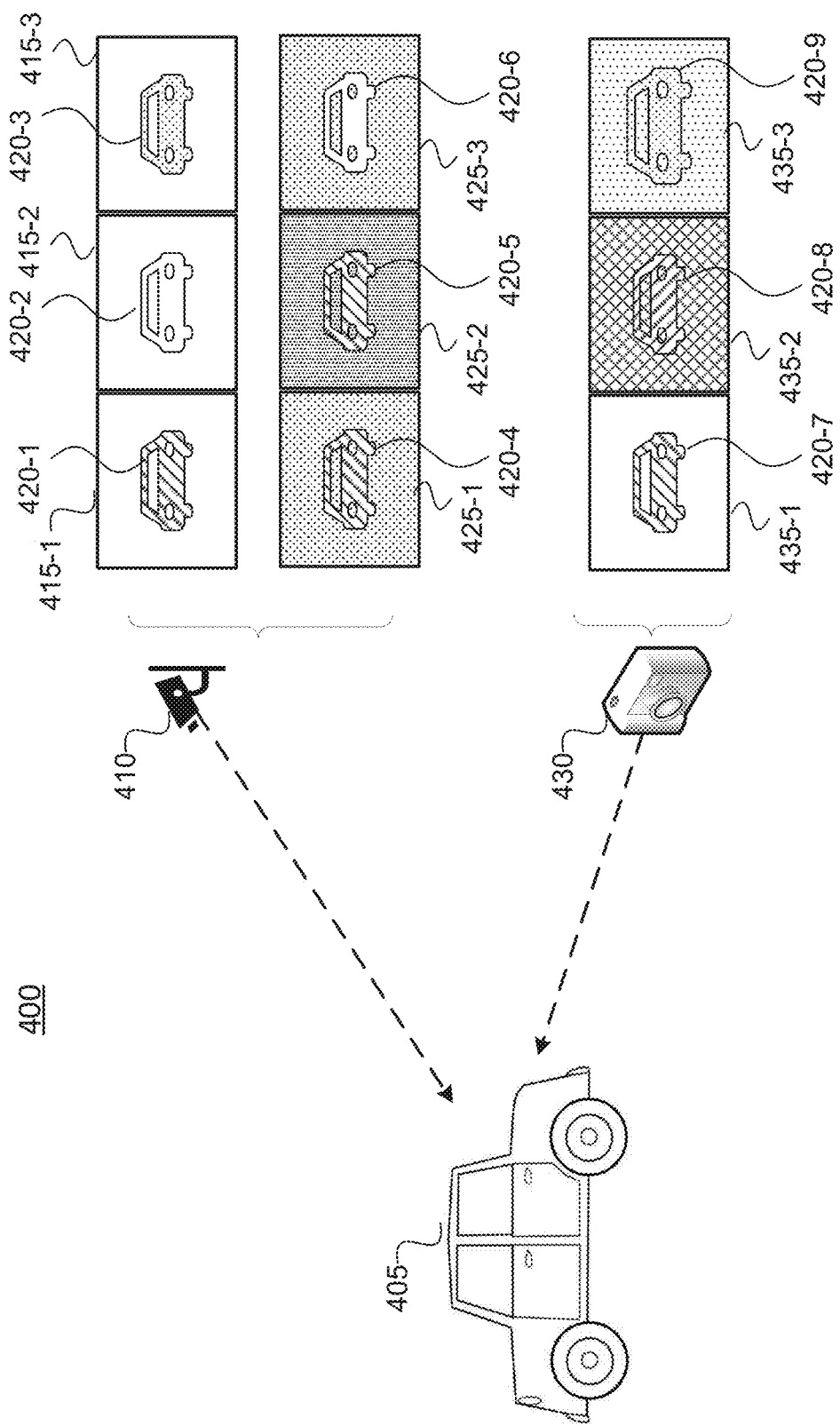
FIG. 4 is a block diagram illustrating factors of variation between web-collected images and surveillance camera-collected images of objects, in accordance with an embodiment of the present invention.

FIG. 4 is a block diagram 400 illustrating factors of variation between web-collected images and surveillance camera-collected images of objects, in accordance with the present invention.

As shown in FIG. 4, factors of variation between web-collected images 430 and surveillance camera-collected images 410 of objects are determined (for example, by system 300, not shown in FIG. 4). By way of illustration, system 300 can apply the processes described herein (for example, based on a model) to car 405 (or motor vehicle, etc.) recognition in a surveillance domain without using labeled data from the surveillance domain. Cars can have large quantity of models. In addition, cars can have large appearance differences in their unconstrained poses, and therefore the processes described in the example embodiments can incorporate viewpoint-aware analyses. Automated car model analysis, particularly the fine-grained car categorization and verification, can be used for purposes in an intelligent transportation system including regulation, description and indexing. For instance, fine-grained car categorization can be exploited to inexpensively automate and expedite paying tolls from the lanes, based on different rates for different types of vehicles.

The images in the surveillance domain 410 can be generated by (or may be received from) surveillance cameras, etc. As shown, the surveillance domain 410 includes daytime surveillance images 415 (shown as 415-1 to 415-3, by way of example, note that the amount of images in each domain can vary and a particular number is shown for ease of illustration) of cars 420 (shown as 420-1 to 420-3) (images taken during the day) and includes nighttime surveillance images 425 (shown as 425-1 to 425-3) of cars 420 (shown as 420-4 to 420-6) (images taken during the night). The nameable attribute in the target domain is lighting condition and system 300 defines the target domain 1 (using images with bright background (taken during the day 415) and the target domain 2 using images with dark background (and/or lower lighting, clarity, visibility, etc.) (taken during the night 425).

The images in the surveillance domain 410 (the target domain) are unlabeled. The web-collected images 430 (for example, images from the source domain, shown as images 435-1 to 435-3 of respective cars 420-7 to 420-9) are labeled. For example, the web-collected images 430 can be labeled based on different conditions in which the image was taken (for example, light or dark lighting conditions, different weather conditions, etc.)

In an example embodiment, the system 300 can determine domain discriminators that allow utilizing unlabeled data from the target domain 410 with labeled training data from the source domain 430. System 300 divides the unlabeled training data from target domain 410 into nighttime surveillance images 425 (shown as 425-1 to 425-3) and using attribute annotations of lighting conditions and ranks the target domains 410 based on the similarity to the source domain. For example, system 300 can divide images collected by surveillance camera into those captured during day and night, and rank day images as a first target and night as a second target. After the images are ranked, system 300 can provide candidate images to be labeled (for example, manually or semi-automatically based on the recognition score) with higher quality by the ranking score (for example, images with higher ranking scores are less degraded by domain specific factors, etc.). Candidate images are taken in similar conditions to the target domains but not labeled yet. The higher quality images may be better suited for labeling and fine tuning an updated model in fine-grained object recognition. Training with the higher quality images can increase the recognition accuracy for fine-grained objects.

Similarly, the system 300 can apply the processes (for example, using a model similar to described above) to road scene segmentation. For example, the source domain is collected from a simulation engine (or other source of labeled images, etc.), and the target domain is composed of real images. The nameable attributes in the target domain can be an attribute that causes a variation in the images generated, such as, for example, weather condition (e.g., rain, fog) or lighting (e.g., day or night), etc. Then, system 300 is able to divide road-scene target images into separate target domains based on the attribute.

Figure 5:
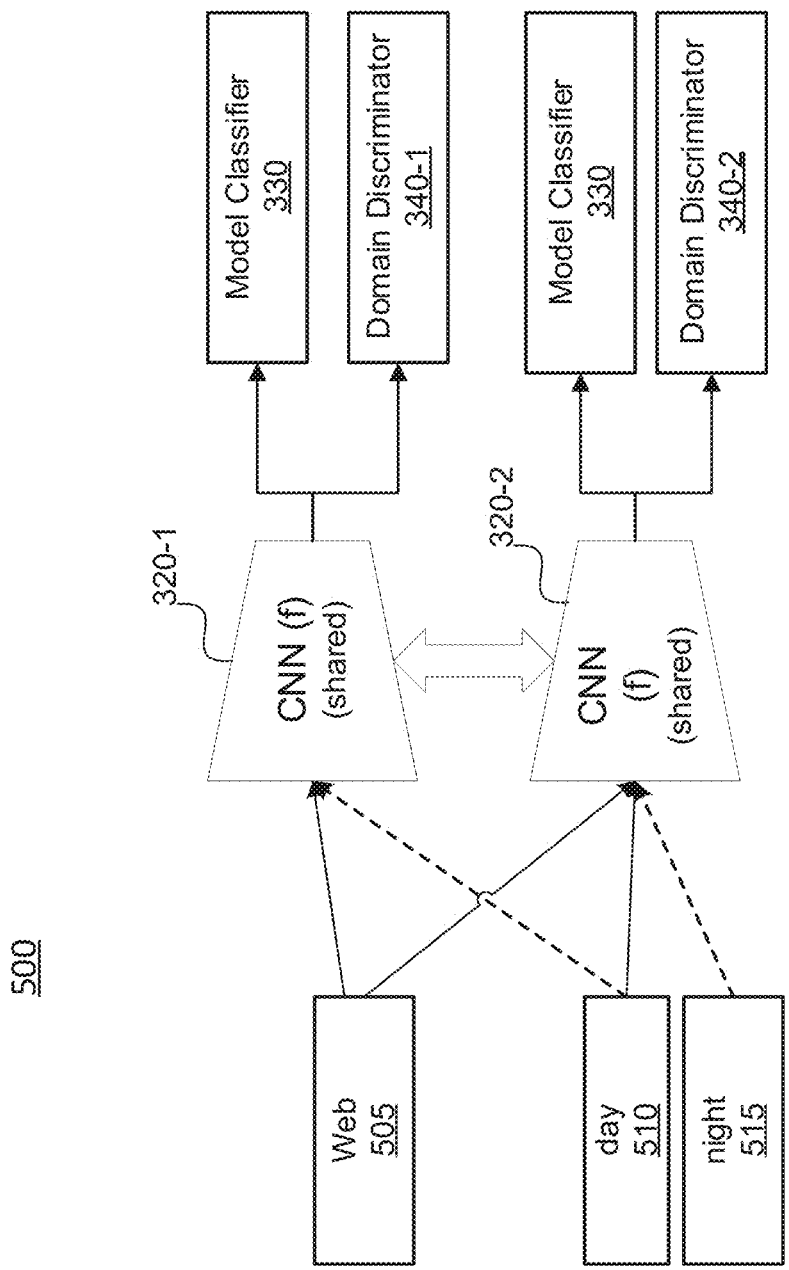
FIG. 5 is a block diagram illustrating a training protocol of a deep neural network with labeled source domain and multiple unlabeled target domains, in accordance with an embodiment of the present invention.

FIG. 5 is a block diagram illustrating a system 500 with a training protocol of a deep neural network with labeled source domain and multiple unlabeled target domains, in accordance with the present invention.

The system 500 can apply multiple domain discriminators 340 between the target domain and a mixture of source (web 505) and preceding target domains (day 510 and night 515). For example, the system 500 can apply two domain discriminators, first between the web (source) domain and the day domain, second between the mixture of the web and the day domain and the night domain.

The system 500 thereby utilizes unlabeled data from the target domain to improve generalization to deployment environment at various conditions. This reduces the development cycle by removing manual data labeling process. The example embodiments also allow an active learning process by automatically generating candidate examples to be (for example, manually) labeled with higher quality.

The system 500 explores attributes in the target domain. For example, the system 500 can determine attributes that cause variation in images and create multiple target domains based on different levels of the attributes associated with the multiple domains. The system 500 implements multi-step adversarial training with multiple target domains.

Figure 6:
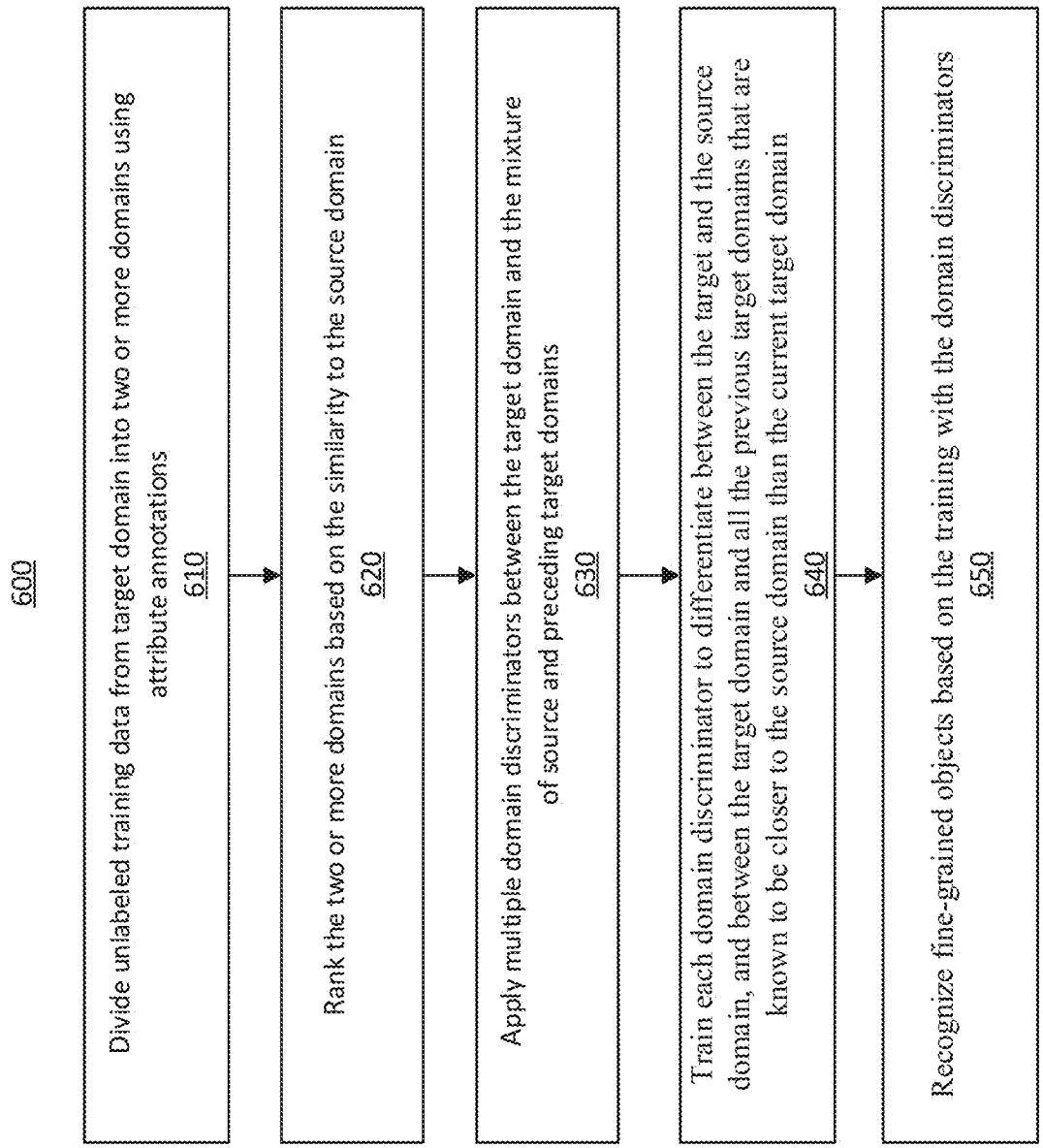
FIG. 6 is a flow diagram illustrating a method for recognizing fine-grained objects in surveillance camera images, in accordance with an embodiment of the present invention.

FIG. 6 is a flow diagram illustrating a method for recognizing fine-grained objects in surveillance camera images, in accordance with the present invention.

At block 610, system 300 divides unlabeled training data from target domain into two or more domains using attribute annotations. For example, the system 300 can determine an attribute that applies to segment the domains based on a continuum (for example, a level of light) or the presence of absence of the attribute. The attribute annotation can then be applied to the unlabeled training data, dividing the target domain into multiple sub domains (target domains).

At block 620, system 300 ranks the two or more domains based on the similarity to the source domain. The domains that are most similar to the source domain are ranked the highest.

At block 630, system 300 applies multiple domain discriminators between the target domain and the mixture of source and preceding target domains.

System 300 then trains each domain discriminator to differentiate not only between the target and the source domain, but also between the target domain and all the previous target domains (at block 640). Previous target domains in this instance refers to other target domains that are closer to the source domain than the current target domain.

At block 650, once the domain discriminators are trained, the domain discriminators can be used, for example in an object recognition system such as shown in FIG. 5, to recognize fine-grained objects based on the training with the domain discriminators. The system 500 can thereby analyze images and recognize features with greater accuracy.

The multi-step adversarial training with multiple target domains increases recognition accuracy of fine-grained objects in surveillance camera images. For example, in video surveillance applications, car verification from appearance can be used to track a car over a multiple camera network when car plate recognition fails. In post-event investigation, the system 500 can retrieve similar cars from a database with car verification processes with increased accuracy based on the domain discriminators.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for recognizing fine-grained objects, comprising:
   dividing, by a processor device, unlabeled training data from a target domain into two or more target subdomains using at least one attribute annotation;
   ranking the two or more target subdomains based on a similarity to a source domain;
   applying multiple domain discriminators between each of the two or more target subdomains and a mixture of the source domain and preceding target domains; and
   recognizing, using the multiple domain discriminators for the target domain, at least one fine-grained object.

2. The method as recited in claim 1, further comprising:
   training each domain discriminator to differentiate between each target subdomain and the source domain; and
   training each domain discriminator to differentiate between at least one current target subdomain and all previous target domains known to be closer to the source domain than the at least one current target subdomain.

3. The method as recited in claim 1, wherein the two or more target subdomains include a nighttime domain and a daytime domain.

4. The method as recited in claim 1, wherein the at least one attribute annotation comprises a lighting condition.

5. The method as recited in claim 1, wherein the at least one attribute annotation comprises a weather condition.

6. The method as recited in claim 1, wherein the target domain includes images from at least one surveillance camera and the source domain includes web-based images.

7. The method as recited in claim 1, wherein the at least one attribute annotation is a road scene.

8. The method as recited in claim 1, further comprising: generating candidate examples to be manually labeled with higher quality.

9. The method as recited in claim 1, further comprising: determining factors of variation between web-collected images and surveillance camera-collected images of cars based on applying the multiple domain discriminators between each of the two or more target subdomains and the mixture of the source domain and the preceding target domains.

10. The method as recited in claim 1, wherein the unlabeled training data includes images of at least one of cars, and faces.

11. A computer system for recognizing fine-grained objects, comprising:
a processor device operatively coupled to a memory device, the processor device being configured to:
divide unlabeled training data from a target domain into two or more target subdomains using at least one attribute annotation;
rank the two or more target subdomains based on a similarity of the at least one attribute annotation to a source domain;
apply multiple domain discriminators between each of the two or more target subdomains and a mixture of the source domain and preceding target domains; and
recognize at least one fine-grained object using the processing device trained using the multiple domain discriminators for the target domain.

12. The system as recited in claim 11, wherein the processor device is further configured to:
train each domain discriminator to differentiate between each target subdomain and the source domain; and
train each domain discriminator to differentiate between at least one current target subdomain and all previous target domains known to be closer to the source domain than the at least one current target subdomain.

13. The system as recited in claim 11, wherein the two or more target subdomains include a nighttime domain and a daytime domain.

14. The system as recited in claim 11, wherein the at least one attribute annotation comprises a lighting condition.

15. The system as recited in claim 11, wherein the at least one attribute annotation comprises a weather condition.

16. The system as recited in claim 11, wherein the target domain includes images from at least one surveillance camera and the source domain includes web-based images.

17. The system as recited in claim 11, wherein the at least one attribute annotation is a road scene.

18. The system as recited in claim 11, wherein the processor device is further configured to:
generate candidate examples to be manually labeled with higher quality.

19. The system as recited in claim 11, wherein the processor device is further configured to:
determine factors of variation between web-collected images and surveillance camera-collected images of cars based on applying the multiple domain discriminators between each of the two or more target subdomains and the mixture of the source domain and the preceding target domains.

20. A computer program product for domain adaptation, the computer program product comprising a non-transitory computer readable storage medium having program instructions embodied therewith, the program instructions executable by a computing device to cause the computing device to perform the method comprising:
dividing, by a processor device, unlabeled training data from a target domain into two or more target subdomains using at least one attribute annotation;
ranking the two or more target subdomains based on a similarity of the at least one attribute annotation to a source domain;
applying multiple domain discriminators between each of the two or more target subdomains and a mixture of the source domain and preceding target domains; and
recognizing at least one fine-grained object using the multiple domain discriminators for the target domain.

* * * * *